J. G. HODGSON & J. G. HODGSON, Jr.
DEMOUNTABLE RESILIENT TIRE SEATING RIM FOR MOTOR CAR OR OTHER VEHICLE WHEELS.
APPLICATION FILED MAR. 17, 1910.
981,594.
Patented Jan. 10, 1911.
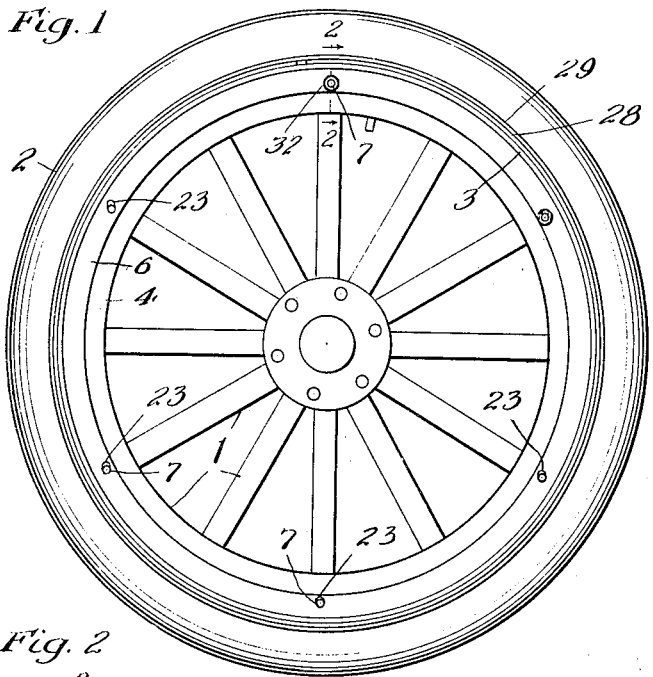
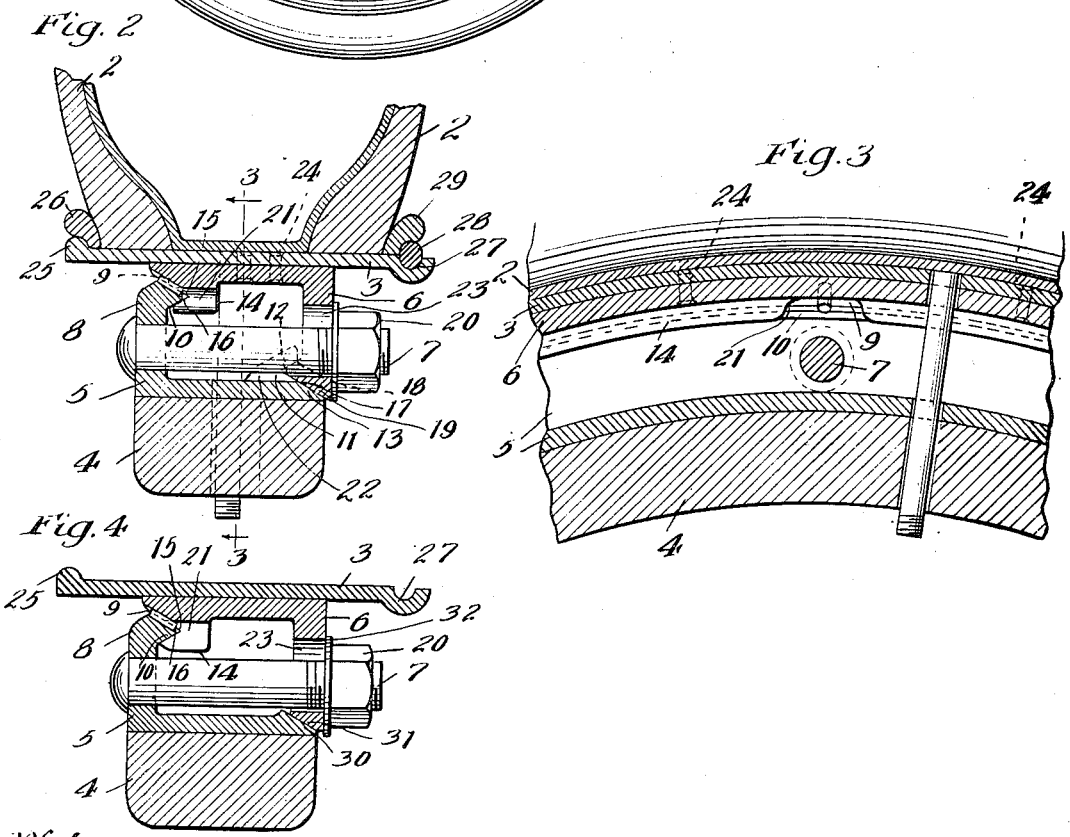

UNITED STATES PATENT OFFICE.

JOHN G. HODGSON AND JOHN G. HODGSON, JR., OF MAYWOOD, ILLINOIS.

DEMOUNTABLE RESILIENT-TIRE-SEATING RIM FOR MOTOR-CAR OR OTHER VEHICLE WHEELS.

981,594. Specification of Letters Patent. Patented Jan. 10, 1911.

Application filed March 17, 1910. Serial No. 549,925.

*To all whom it may concern:*

Be it known that we, JOHN G. HODGSON and JOHN G. HODGSON, Jr., citizens of the United States, residing in Maywood, in the county of Cook and State of Illinois, have invented a new and useful Improvement in Demountable Resilient-Tire-Seating Rims for Motor-Car or other Vehicle Wheels, of which the following is a specification.

Our invention relates to improvements in demountable tire seating rims for motor car or other vehicle wheels.

The object of our invention is to provide a demountable tire seating rim for resilient tires of motor car wheels or other vehicle wheels, which will be of a strong, simple, efficient and durable construction, and enable the tire seating rim to be quickly removed and replaced upon the wheel, and which at the same time will not exert any outward or bursting strain upon the demountable tire seating rim, and which will also be adapted for use upon tire seating rims of any suitable, desired or known construction.

In the accompanying drawing forming a part of this specification, Figure 1 is a side elevation of a resilient tired motor car wheel embodying our invention. Fig. 2 is a cross section on line 2—2 of Fig. 1. Fig. 3 is a vertical section on line 3—3 of Fig. 2. Fig. 4 illustrates a modification.

In the drawing, 1 represents a motor car or other vehicle wheel, 2 its resilient tire of any suitable type or construction, 3 the tire seating rim of any suitable kind or construction, 4 the felly, 5 a metal band shrunk thereon and 6 a coöperating metal ring or band secured to, and preferably in a separate piece from the tire seating rim 3, and 7 clamp bolts extending through the band 5 and ring 6.

The metal band 5 which is shrunk upon the felly of the wheel in the usual manner is provided on its inner side with an upright flange or rib 8, having double cone or wedge faces 9, 10 projecting toward the outer side of the wheel and preferably of an external or rib variety. The metal band or ring 5 is also provided on its outer side with a rib 11, having double cone or wedge faces 12, 13, and preferably of an external groove or V variety and likewise facing toward the outer side of the wheel.

The coöperating metal ring or band 6 is provided near its inner edge and on its inner face with a rib 14 having double cone or wedge faces 15 and 16, adapted to engage the double cone or wedge faces 9, 10 of the band 5, and on its outer side the demountable ring 6 is provided with a flange or rib 17, having double cone or wedge faces 18, 19 adapted to engage the double cone or wedge faces 12, 13 of the rib 11 on the band 5. The clamp bolts 7 extend transversely through the bands or rings 5, 6 or the flanges 8, 17 thereof, and are furnished with threaded nuts 20 which, when screwed home, clamp the demountable tire seating rim 3 and its ring 6 very rigidly, firmly and securely on the metal bands without exerting any outward wedging or bursting strain or pressure on said rim 3 or its ring 6, because the interengaging double cone or wedge faces of the bands or rings 5, 6 effectually neutralize each other. To prevent the ribs 11 and 14 on the rings 5, 6 from interfering with the bolts 7 as the bolts are screwed home and the parts clamped together, we provide said ribs 11 and 14 with notches or cut out portions 21, 22 at the bolts 7. For the same purpose, the rib or flange 17 on the ring 6 is provided with somewhat oblong slots 23 for the bolts to pass through. These slots also facilitate removal.

The ring 6, for convenience of manufacture, is preferably made in a separate piece from the demountable tire seating rim 3 and secured thereto by rivets 24.

The tire seating rim 3 may be of any suitable, desired or known construction. We have, for convenience in the drawing, illustrated the same as of a well known quick detachable side ring type, that is to say, as provided at the inner side of the wheel with a flange 25 and side ring 26 and at the outer side of the wheel with a groove 27, split ring 28 and side ring 29.

The transverse bolts 7 extending through the rims or rings 5, 6 effectually prevent any tendency toward circumferential slipping of the rings in respect to each other. If desired, other suitable provisions, may be provided for such purpose.

In the modification illustrated in Fig. 4, the rim 5 and ring 6 are each furnished at the outer side of the tire with only single cone or wedge faces 30 and 31 respectively. Dirt is entirely excluded from between the rims or rings 3, 5 as the joints between the rims are tight fitting and double cone or wedge faced, and as the washers 32 and nuts 20 of the bolts 7 close the slots through which the bolts extend. In our construction also, the ready removal or separation of the rings 3, 5 is in no way interfered with by any rusting of the parts that may occur, owing to the double cone or wedge contacting faces of these rings.

We claim:—

1. In a demountable wheel rim, the combination with an inner metal band on the wheel having oppositely disposed concentric double cone or wedge faces, of a tire seating rim having a member furnished with oppositely disposed concentric double cone or wedge faces engaging the double cone or wedge faces of said metal band, and clamping bolts extending through said metal band and ring, said double cone faces neutralizing each other and preventing any bursting strain being exerted upon the tire seating rim or the member secured thereto, substantially as specified.

2. In a demountable vehicle wheel rim, the combination with a metal band on the wheel, having at its inner edge double cone or wedge faces and at its outer edge double cone or wedge faces, of a demountable tire seating rim having a ring furnished with double cone or wedge faces at its inner edge, and with double cone or wedge faces at its outer edge interengaging with said double cone or wedge faces on said metal band, and clamp bolts extending through said metal band and ring, said double cone faces on said band and ring neutralizing each other and preventing any bursting strain being exerted upon the tire seating rim, substantially as specified.

3. In a demountable vehicle wheel rim, the combination with an inner metal band on the wheel, provided on its inner side with a flange having double cone or wedge faces, of a demountable tire seating rim having a member furnished at its inner side with double cone or wedge faces, and on its outer side with a flange, and clamping bolts extending through said flange and through said flange of said metal band, said double cone faces neutralizing each other and preventing any bursting strain being exerted upon the tire seating rim or the member secured thereto, substantially as specified.

4. In a demountable vehicle wheel rim, the combination with a metal band on the wheel, having at its inner edge double cone or wedge faces and at its outer edge double cone or wedge faces, of a demountable tire seating rim having a ring furnished with double cone or wedge faces at its inner edge, and with double cone or wedge faces at its outer edge interengaging with said double cone or wedge faces on said metal band, and clamp bolts extending through said metal band and ring, one of said double cone faces being radially inside of and the other set radially outside of said clamp bolts, substantially as specified.

5. In a demountable vehicle wheel rim for resilient tires, the combination with a metal band on the wheel having at the inner side of the wheel an annular flange, of a demountable tire seating rim having on its inner face a ring provided at the outer side of the wheel with an annular flange, and clamp bolts extending transversely through the flanges of said band and ring, said band and ring having interengaging anchoring devices including double cone faces on the inner side of the wheel and also on the outer side of the wheel, substantially as specified.

JOHN G. HODGSON.
JOHN G. HODGSON, Jr.

Witnesses:
PEARL ABRAMS,
H. M. MUNDAY.